United States Patent [19]

Emmons et al.

[11] Patent Number: 5,297,987

[45] Date of Patent: Mar. 29, 1994

[54] PRESSURE CONTROL SERVO LOOP

[75] Inventors: F. Richard Emmons, West Hartford; Thomas W. Donahue, Rocky Hill, both of Conn.

[73] Assignee: United Technologies Corporation, Hartford, Conn.

[21] Appl. No.: 890,808

[22] Filed: Jun. 1, 1992

[51] Int. Cl.$^5$ ............................................. B64D 13/00
[52] U.S. Cl. ....................................................... 454/74
[58] Field of Search .............................. 454/72, 73, 74

[56] References Cited

U.S. PATENT DOCUMENTS

| | | |
|---|---|---|
| Re. 23,536 | 8/1952 | Del Mar . |
| 2,428,283 | 9/1947 | Kemper . |
| 2,435,819 | 2/1948 | Crever et al. . |
| 2,447,918 | 8/1948 | Teague et al. . |
| 2,549,672 | 4/1951 | Del Mar . |
| 2,578,539 | 12/1951 | Green . |
| 2,734,442 | 2/1956 | Jensen . |
| 2,767,636 | 10/1956 | Fischer et al. . |
| 2,983,211 | 5/1961 | Andresen, Jr. . |
| 3,141,399 | 7/1964 | Andresen, Jr. . |
| 3,375,771 | 4/1968 | Balcom, Jr. ............................ 454/74 |
| 3,376,803 | 4/1968 | Emmons ................................ 454/74 |
| 3,461,790 | 8/1969 | Kinsell et al. ........................ 454/74 |
| 3,473,460 | 10/1969 | Emmons . |
| 3,577,902 | 5/1971 | Gardner . |
| 4,553,474 | 11/1985 | Wong et al. ........................... 454/74 |

Primary Examiner—Harold Joyce
Attorney, Agent, or Firm—Richard H. Kosakowski

[57] ABSTRACT

A pressure control servo system for regulating cabin pressure in jet airplanes. In the preferred embodiment, the system comprises a first summing network, which sums data from a air data computer (ADC), a flight deck (FD), and a flight management computer (FMC), which produces a pressure reference signal, $P_R$, indicative thereof. The summing network is connected to both a derivative path, and a proportional path. The derivative path comprises a proportional gain shaper, a derivative, an altitude dependent gain, and a gain multiplier. The proportional path comprises an integral gain shaper, an altitude dependent gain, a gain multiplier, and a rate limit. The outputs of the derivative and proportional paths are then connected to a second summing network, which sums those signals. Then, this summed output passes through a common digital integrator with a limit and a rate limit. The output of the common integrator is eventually compared to an actual pressure reference signal to a corresponding position signal, which then drives an outflow valve. This valve regulates the amount of air exhausted from an aircraft's cabin. The outflow valve moves, causing a change in cabin pressure. This change in cabin pressure is then measured and a signal is accordingly sent back to the first summation network. The gain shapers allow the gains to vary as a function of the magnitude of pressure error. The gain is decreased for small errors. This design provides increased stability for small disturbances, without sacrificing the response to large disturbances.

16 Claims, 4 Drawing Sheets

PRESSURE CONTROL SERVO LOOP

BACKGROUND OF THE INVENTION

The present invention relates to devices used to control cabin pressure in jet airplanes. More particularly, it relates to control logic which generates an outflow valve signal position command, wherein the resultant signal is then used to control an outflow valve that regulates the amount of air exhausted from the cabin.

Regulation of cabin pressure is critical because the human ear is very sensitive to even small pressure changes. Therefore, to prevent discomfort, the cabin pressure control must maintain control in such a way as to prevent rapid changes in pressure. To prevent rapid changes in pressure, the cabin pressure control must be capable of responding quickly to disturbances, such as the skin pressure effect during takeoff rotation or changes in cabin in-flow.

Cabin pressure is also difficult to regulate due to the nature of the cabin response. The cabin responds differently to changes in the outflow valve position depending upon the pressure difference between the cabin pressure and the ambient pressure (outside the plane). The cabin also responds differently depending on cabin volume. For example, the system responds differently if it is used in freight or passenger air crafts.

One early approach for a cabin pressure servo loop used on the 747 and L1011 analog systems was an integral plus lead-lag compensation. The initial digital system simply reproduced the lead-lag logic in digital form. It was found, however, that since the digital system has a finite resolution and a finite time response, because it is not continuous, the net result was an inaccurate reproduction of the lead-lag logic; thus, the desired control response could not be achieved.

These shortcomings led to another form of control logic, known as proportional plus integral logic. This logic also has drawbacks. For example, over-travel, or over-saturation, in the integral path must be controlled in order to avoid problems when the system drives the valve to its position limit. Ideally, the system should come off its limit immediately when the position command reverses in direction. With the proportional and integral components, in order to avoid this problem, extra logic is necessary.

Accordingly, it is the primary object of the present invention to provide a cabin pressure control system that responds quickly to transients and avoids over-saturation, while at the same time maintaining stability within the system.

It is another object to design a system that responds in the same manner, regardless of the cabin-to-ambient differential pressure.

It is still another object to provide a proportional plus integral logic circuit, wherein the integral path can be controlled so as to prevent over-saturation.

It is yet another object to provide a proportional plus integral logic circuit in which integral and proportional gain paths can be separately modified by non-linearities and gains.

It is still a further object of the present invention to design a control system that is easily implemented into software.

The above and other objects and advantages of this invention will become more readily apparent when the following description is read in conjunction with the accompanying drawings.

SUMMARY OF THE INVENTION

A servo system for controlling pressure in cabins of jet airplanes is disclosed. In the preferred embodiment, the invention basically comprises a $P_R$ signal (which is generated from data from an air data computer, a flight management computer, and a flight deck) and a $P_C$ signal (from a pressure sensor) which are summed at a first summation network; the output of the first summation point is split into a derivative path and a proportional path; the signals carried along these paths are summed and then pass through a common time integrator. This logic generates a position signal which is then used to control an outflow valve that regulates the amount of air exhausted from a cabin. Then, as the valve changes, the cabin pressure changes and a signal $P_C$ is fed back into the servo loop through the pressure sensor. This, in turn, creates a new error signal which again positions the outflow valve.

The derivative path is comprised of a gain shaper, a time derivative, an altitude dependent gain, and a gain multiplier.

The proportional path, whose output is proportional to the input, is comprised of a different gain shaper, an independent altitude dependent gain, a gain multiplier, and a rate limit.

The common time integral path allows for improved implementation of both magnitude and rate limits. Because the integration is in the common path, it allows for easy control of the saturation. After the signal passes through the common time integral section, the signal is compared to an actual valve position reference signal. The resultant error signal is then used to control an outflow valve that regulates the amount of air exhausted from the cabin.

DETAILED DESCRIPTION OF THE PREFERRED EMBODIMENT

Figure 1:
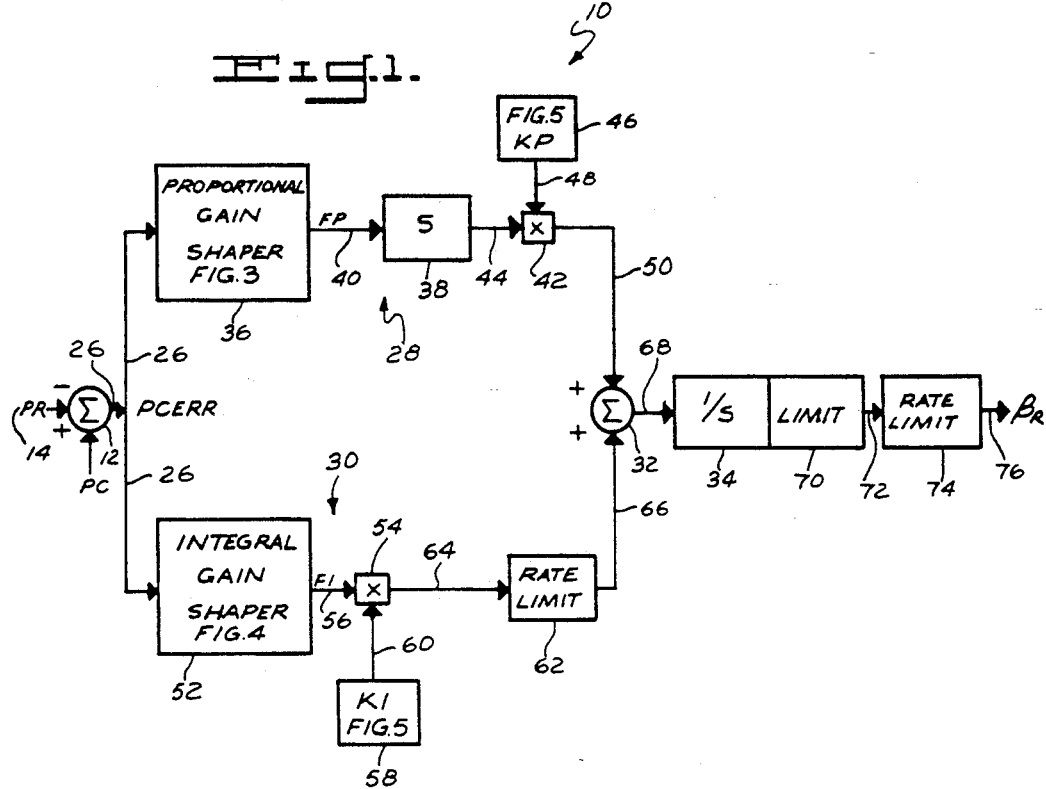
FIG. 1 is a schematic block diagram of an aircraft cabin pressure control system in accordance with the present invention.
Figure 2:
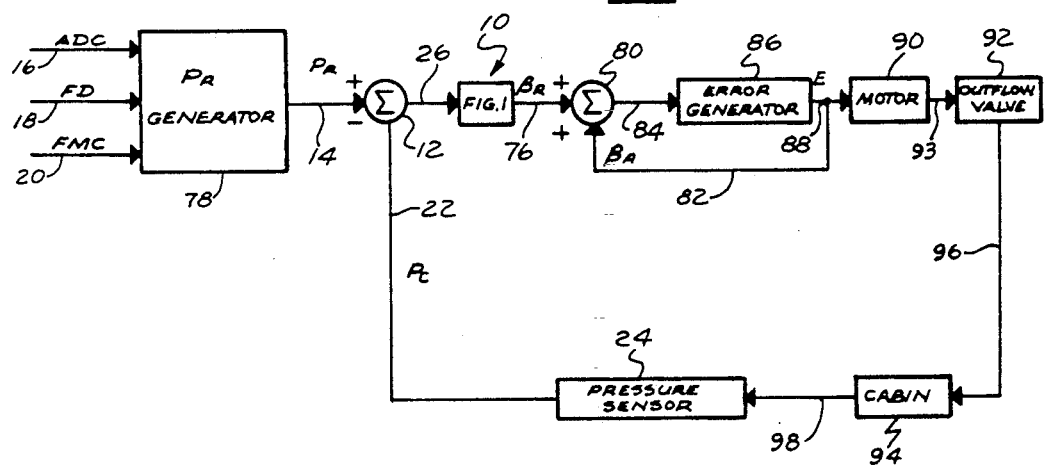
FIG. 2 is a schematic block diagram of the entire control system of FIG. 1., showing the location of an outflow valve.

Referring to the drawings in detail, the preferred embodiment of a pressure control servo system is shown and generally designated by the reference numeral 10. As shown in FIGS. 1 and 2, in the preferred embodiment the invention basically comprises: a first summing network 12, which sums a $P_R$ signal carried on line 14 (which is generated by a software program and compiled from data from an air data computer (ADC) which is carried on line 16, data from a flight deck (FD) carried on line 18, and data from a flight management computer (FMC) carried along line 20) and a $P_C$ signal carried on line 22 (from a pressure sensor 24)); the summing network 12 produces an output signal carried on line 26 which then connects to both a derivative path 28 and a proportional path 30; the output signals of these paths 28, 30 are then summed at the second summation network 32 and pass through a common integrator 34. The signal carried along line 26 is sometimes referred to as a pressure cabin error signal (PCERR).

The derivative path 28 comprises a proportional gain shaper 36 which is connected to the output of the first summation network by line 26; a time derivative 38 which is connected to the proportional gain shaper 36 by line 40; a gain multiplier 42 which connects to the derivative 38 by line 44; an altitude dependent gain constant 46 which connects to the gain multiplier 42 by line 48; and the gain multiplier 42 connects to the second summation network 32 by line 50.

The proportional path 30 comprises: an integral gain shaper 52 connected to the first summation network 12 by line 26; a gain multiplier 54, connected to the gain shaper 52 by line 56; an altitude dependent gain constant 58, connected to the gain multiplier 54 by line 60; a rate limit 62, connected to the gain multiplier 54 by line 64; and the rate limit 62 connects to the second summation network 32 by line 66.

The resulting signals, carried on lines 50, 66, are then summed at the second summation network 32. The summed output is carried along line 68 and passes through a common integrator 34, with a limit 70. The signal which results from the integrator 34 and its limit 70 is carried on line 72 and passes through a rate limit 74. The signal resulting from the rate limit 74 is carried along line 76 and designated $\beta_R$. $\beta_R$ designates the desired outflow valve position.

As shown in FIG. 2, data from an air data computer (ADC) is carried along line 16, data from a flight deck (FD) is carried along line 18, and data from a flight management computer (FMC) is carried along line 20. This data, on lines 16, 18, 20, is entered into a software program, or $P_R$ generator, 78 which generates a pressure reference signal ($P_R$) which is carried along line 14. $P_R$ can be generated in any manner and this manner is well known in the art. The $P_R$ generator 78 is connected by line 14 to the first summing network 12. The first summing network 12 is also connected to line 22. Line 22 carries a cabin pressure signal ($P_C$).

Referring again to FIG. 2, after lines 14, 22 are connected to the first summing network 12, line 26 connects the first summing network 12 to the pressure control servo system 10, which is shown in detail in FIG. 1. The pressure control servo system 10 is connected by line 76 to a third summing network 80. As discussed above, line 76 carries the reference signal $\beta_R$, which designates the desired valve position.

The third summing network 80 is also connected to line 82. Line 82 carries a signal $\beta_A$, which designates the actual valve position.

Line 84, which carries the output of the third summing network 80, passes through computer software, or error generator 86. The error generator 86 generates an error signal (E) which is carried on line 88 in a manner well known in the art. The output signal carried on line 88, E, drives a motor 90, which connects to an outflow valve 92 by line 93. The outflow valve 92 regulates the amount of air exhausted from the aircraft's cabin 94, carrying the signal along line 96. The error signal, E, on line 88 is fed back to the third summing network 80, via line 82. The error signal on line 88 drives a motor 90, which actuates the valve 92, if there is a difference between $\beta_A$ and $\beta_R$. The system will alter the actual cabin pressure to drive the error signal 88 to zero, in a manner well-known in the prior art.

The cabin 94 connects to the pressure sensor 24, via line 98. As the valve 92 changes, the cabin pressure changes. These changes are fed back into the servo loop 10 through the pressure sensor 24 over line 22.

Figure 3:
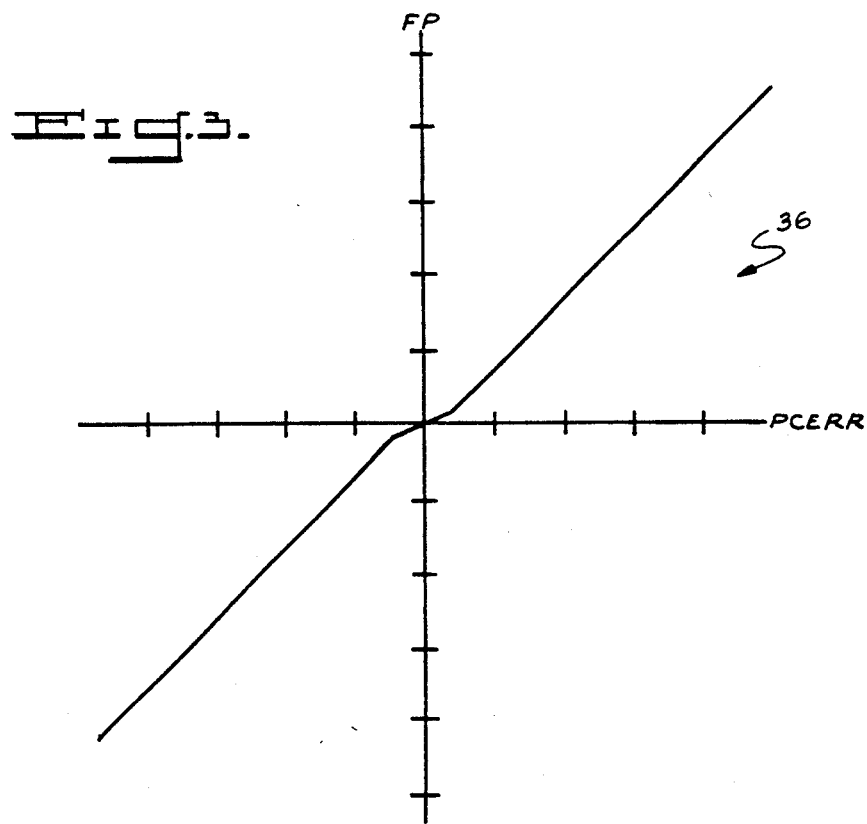
FIG. 3 is a graph of a proportional gain shaper.
Figure 4:
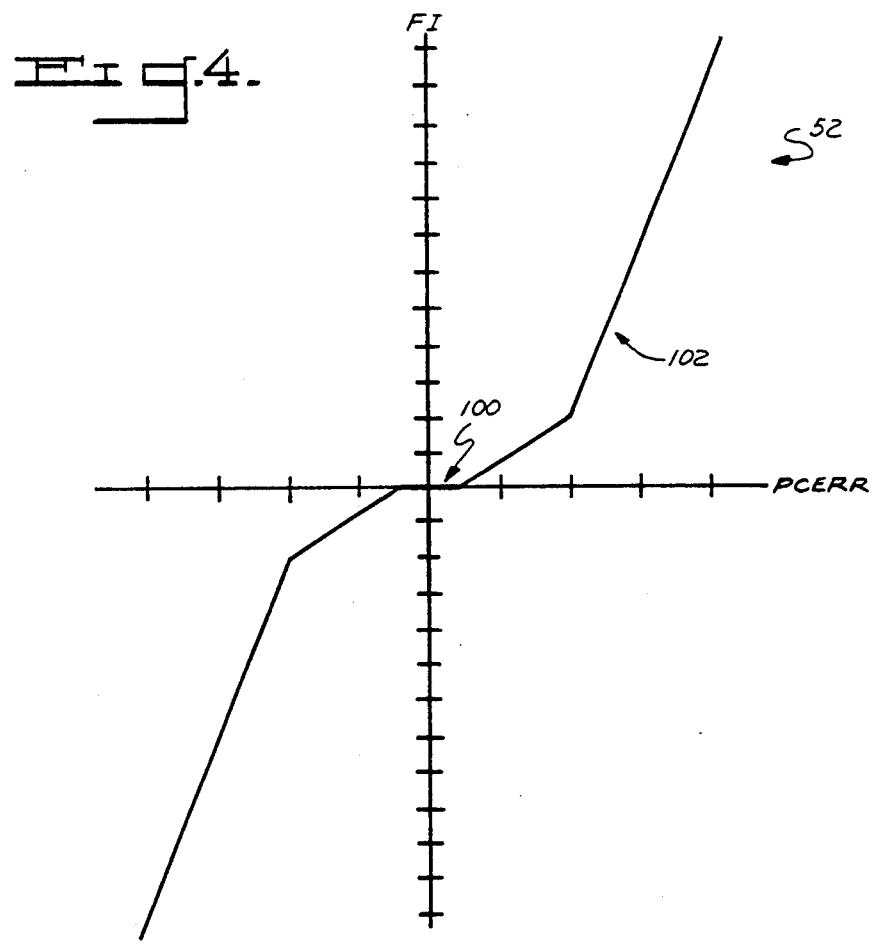
FIG. 4 is a graph of an integral gain shaper.

The proportional and integral gain shapers 36, 52 are shown in FIGS. 3, 4. These shapers 36, 52 allow the gains to vary as a function of the magnitude of cabin pressure error. The cabin pressure error is shown in FIG. 1 and is carried along line 26. As shown in FIGS. 3, 4, the gain is decreased for small errors. This design provides increased stability for small signal disturbances, without sacrificing the response to large disturbances. As shown in FIG. 3, the cabin pressure error (PCERR) is shown on the X-axis. The Y-axis depicts the resulting gain, designated as FP. As shown in FIG. 1, FP is the signal carried on line 40. FIG. 4 shows the output of integral gain shaper 52 and designates it as FI. The output FI is carried on line 56, which is shown in FIG. 1.

As shown in FIG. 4, the integral gain shaper 52 has a small signal deadband 100 at null. Further, the integral gain shaper 52 has an additional gain increase 102 for large errors. This additional gain increase 102 permits the valve 92 to drive at even faster rates when very large transients are encountered.

Figure 5:
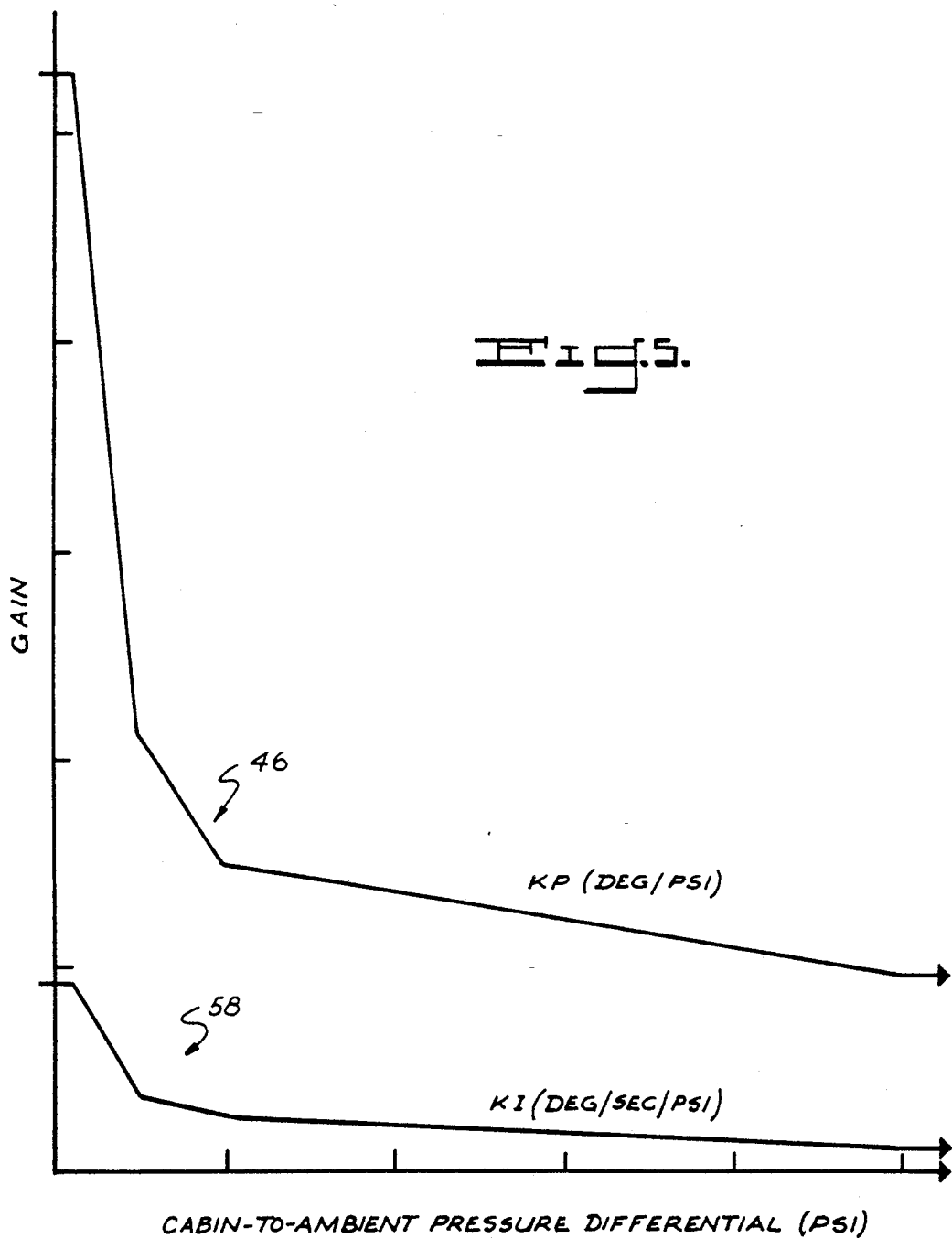
FIG. 5 is a graph showing both altitude dependent gain constants.

FIG. 5 shows gain constants 46, 58, which are also designated as KP and KI, respectively. As shown in FIG. 5, the cabin-to-ambient pressure differential (in p.s.i.) is shown on the X-axis and resulting gain is shown on the Y-axis.

In the preferred embodiment, this invention 10 has been implemented into software. While the best mode uses implementation by computer software, one could implement the invention with dedicated digital hardware or analog hardware.

Figure 6:
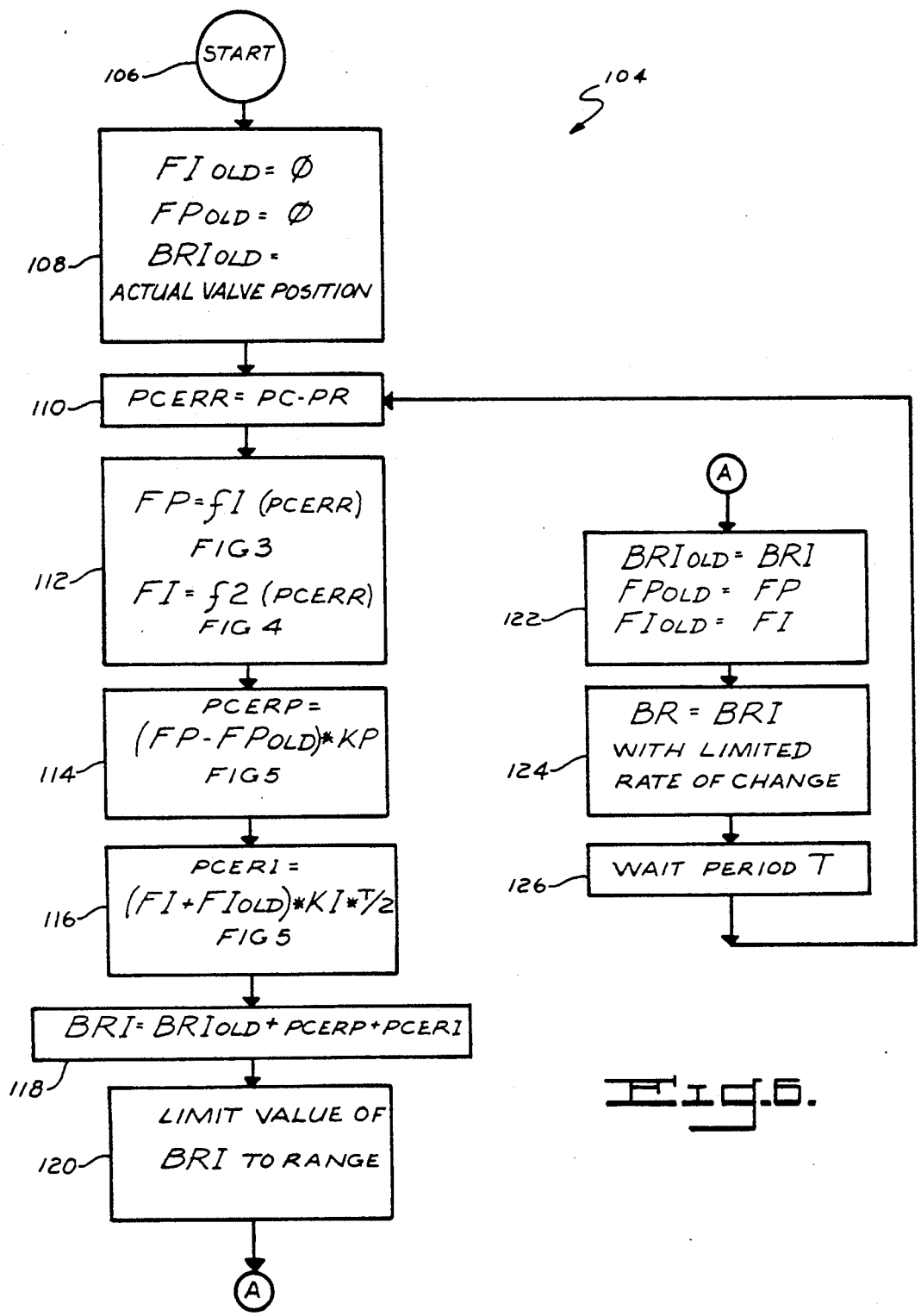
FIG. 6 is a flow chart of a computer implementation of the invention.

FIG. 6 is a flow chart 104 representing a computer implementation of the invention 10. The signal $\beta_R$, carried along line 76, can be implemented into software in any suitable manner. One suitable method is shown in FIG. 6. As shown, the flow chart 104 begins in block 106. Block 106 is the start position. Next, block 108 sets the initial values of $FI_{OLD}$ and $FP_{OLD}$ to zero. $BRI_{OLD}$ is initially the actual valve 92 position.

The third block 110 generates the signal PCERR, which is carried along line 26. PCERR is the difference between the pressure reference, carried on line 14, and the cabin pressure,, carried on line 22.

The next block 112 requires the user to determine the corresponding FP and FI values, carried along lines 40 and 56, respectively. The values of FP and FI can be found in FIGS. 3, 4.

Block 114 shows the generation of an intermediate signal PCERP. As shown:

$$PCERP = (FP - FP_{OLD}) * KP$$

where KP is generated from the values shown in FIG. 5 and is a function of PC-PA.

Block 116 shows the generation of another intermediate signal PCERI. As shown:

$$PCERI = (FI + FI_{OLD}) * KI * T/2,$$

where KI is generated from the values shown in FIG. 5, where KI is a function of PC-PA, and where T is the sample period.

Then, block 118 generates the value of BRI:

BRI = BRI$_{OLD}$ + PCERP + PCERI.

Block 120 then checks the value of BRI and limits it to the following range: −1.5 to 98.5 degrees.

Block 122 updates the values of BRI$_{OLD}$, FP$_{OLD}$, and FI$_{OLD}$. As shown:

$BRI_{OLD} = BRI;$
$FP_{OLD} = FP;$ and
$FI_{OLD} = FI.$

Then, block 124 sets $\beta_R$ equal to the value of BRI, with limited rate of change. $\beta_R$ is not permitted to change by more than ±12/T degrees in a given sample period T.

Block 126 then directs the user to wait one sample period T.

This loop then continues so long as the aircraft is running. Consequently, the only time the flow chart 104 is not in use is when the aircraft has stopped. Hence, no "end" sign has been inserted into the flow chart 104.

Now, the operation of the servo system 10 will be discussed as it functions while the plane is resting, taking off, cruising, and landing.

When the aircraft (not shown) is on the ground, the valve 92 is full-open, or very nearly full-open. Then, as the aircraft starts to roll, the cabin 94 is immediately slightly pressurized. Typically, this means that the cabin 94 is pressurized approximately 0.1 psi above the ambient pressure. (The ambient pressure is calculated by the digital air data computer 16 (ADC).) The cabin 94 is pressurized because as the aircraft rotates during takeoff, it gets a so-called pressure bumper, or has at least a tendency to get a pressure bumper, due to the changes in the skin pressure across the outflow valve 92. If the cabin 94 is slightly pressurized, the cabin control system can help to damp out these pressure bumps.

During takeoff, the system receives its largest disturbance. The valve 92 is wide open and moving closed at its maximum rate. At this time, the circuit 10 is producing its largest output over line 76 so as to move the valve 92 as quickly as possible; the signal 26 is going through both the derivative and proportional paths 28, 30 and driving the integrator 34 at its maximum value.

As the aircraft starts to climb, it goes onto a climb schedule (not shown). (A climb schedule is set by what is determined as a desired cruise altitude, which is provided by the flight management computer over line 20 (FMC), and is then compared to the aircraft's actual altitude in a manner well known in the art.) (The actual altitude is based upon the ambient pressure which comes in through the digital air data computer over line 16 (ADC).) The climb schedule is basically a schedule of the P$_R$, which is carried over line 14. As the valve 92 comes within twenty percent of its closed position, it settles down. The valve 92 is modulating, but it is modulating to a more closed position. Once the aircraft is in cruise and everything is steady, there is no integral gain and the signal carried over line 26 passes almost entirely through the derivative path 28. This is the objective of the invention. If the proportional path 30 is active for very low error signals at cruise, the signal will oscillate slightly continuously.

The invention 10 maintains the performance of the valve 92. As the aircraft goes through the pressure bumps upon rotation, it requires the valve 92 to do a lot of slowing in order to compensate for the skin pressures.

There are two problems: the valve 92 should respond quickly to minimize the pressure bumps, yet while going through a gradual climb or cruising, the valve 92 should remain stable. Usually, in order to get the valve 92 to respond quickly, a user would sacrifice stability. However, due to the invention's 10 use of gain shapers 36, 52 on two different paths and altitude-dependent variable gains 46, 58 on paths 28, 30, the invention provides for both good stability and quick response to transients.

Upon landing, the transients, or system disturbances, are not as significant. This is because the plane descends gradually and the valve 92 is simultaneously gradually opening. Then, as the plane touches down, the valve 92 goes to a wide-open position.

It should be understood by those skilled in the art that obvious structural modifications can be made without departing from the spirit of the invention. Accordingly, reference should be made primarily to the accompanying claims rather than the foregoing specification to determine the scope of the invention.

Having thus described the invention, what is claimed is:

1. In a control system for regulating aircraft cabin pressure having a first summation network for summing a desired cabin pressure signal with an actual cabin pressure signal, and a second summation network which generates an output signal, wherein the improvement comprises a proportional path and a derivative path separate from the proportional path, and means for connecting the proportional path between the first summation network and the second summation network and means for connecting the derivative path between the first summation network and the second summation network, wherein the output signal of the second summation point passes through an integrator.

2. The control system of claim 1, wherein the proportional path also comprises an integral gain shaper.

3. The control system of claim 1, wherein the derivative path also comprises a proportional gain shaper.

4. The control system of claim 2 wherein the integral gain shaper comprises a signal deadband.

5. The control system of claim 1, wherein both the proportional path and the derivative path both contain a variable gain that is a function cabin-to-ambient differential pressure.

6. A control system for regulating aircraft cabin pressure comprising:
   a. means for providing a reference cabin pressure signal, P$_R$, indicative of a desired value of cabin air pressure;
   b. sensing means for sensing the actual cabin pressure and producing an actual cabin pressure signal, P$_C$, indicative thereof;
   c. a first summing network means responsive to the reference cabin pressure signal and the actual cabin pressure signal for producing an error signal indicative of any difference therebetween;
   d. a derivative path, responsive to the error signal, comprising a derivative, an altitude dependent gain and multiplier, and electronic means for connecting the derivative, the gain and multiplier, wherein the derivative path provide a derivative signal indicative of the derivative of the error signal;
   e. a proportional path, responsive to the error signal, comprising an independent altitude dependent gain and multiplier, a rate limit, and electronic means for connecting the gain and multiplier to the rate limit, wherein the proportional path provides a proportional signal that is proportional to the error signal;

f. a second summing network means for summing the proportional signal with the derivative signal and for providing a summed signal indicative thereof, wherein the summed signal passes through an integrator which is electronically connected to the second summing network means, wherein an output of the integrator passes through a limit which is electronically connected to the integrator, wherein an output of the limit passes through a rate limit which is electronically connected to the limit, and wherein the rate limit generates a signal $\beta_R$ indicative of a desired position of an outflow valve; and g. wherein the $\beta_R$ signal electronically activates the outflow valve which exhausts air from the aircraft cabin.

7. The control system of claim 6, wherein the derivative path also comprises a proportional gain shaper.

8. The control system of claim 6, wherein the proportional path also comprises an integral gain shaper.

9. The control system of claim 8, wherein the integral gain shaper contains a deadband at null.

10. A control system for regulating aircraft cabin pressure comprising:

a. a first summation network having a positive terminal, a negative terminal, and an output, wherein a desired cabin pressure signal, $P_R$, indicative thereof is electronically sent to the negative terminal, and wherein a signal which is electronically sent from a pressure sensor is electronically connected to the positive terminal;

b. a derivative path, wherein the derivative path is connected to the output of the first summation network, and wherein the derivative path comprises a derivative, a gain, a multiplier, a means for connecting the derivative to the output of the first summation network, a means for connecting the derivative to the gain, and a means for connecting the gain to the multiplier;

c. a proportional path, wherein the proportional path is connected to the output of the first summation network and wherein the proportional path comprises a gain, a multiplier, a rate limit, and a means for connecting the multiplier to the output of the first summation network, a means for connecting the gain to the multiplier, and a means for connecting the multiplier to the rate limit;

d. a second summation point having two positive terminals and an output;

e. a means for connecting the multiplier of the derivative path to one positive terminal of the second summation network;

f. a means for connecting the rate limit of the proportional path to the other positive terminal of the second summation network;

g. an integrator;

h. a means for connecting the output of the second summation point to the integrator;

i. a limit;

j. a means for connecting the integrator to the limit;

k. a rate limit;

l. a means for connecting the limit to the rate limit; and m. wherein the signal generated by the integrator, limit, and rate limit generates a desired valve reference position, $\beta_R$, indicative thereof, wherein $\beta_R$ is used to drive a motor which regulates an outflow valve, which exhausts air from the cabin.

11. The control system of claim 10, wherein the derivative path also comprises a proportional gain shaper and a means for connecting the proportional gain shaper between the output of first summation point and the derivative.

12. The control system of claim 10, wherein the proportional path also comprises an integral gain shaper and a means for connecting the integral gain shaper between the output of the first summation point and the gain multiplier.

13. A control system for regulating aircraft cabin pressure comprising:

a. means for sensing the pressure of the environment external to the cabin pressure and producing a reference signal, $P_R$, indicative thereof;

b. means for sensing the actual cabin pressure and producing a signal, $P_C$, indicative thereof;

c. means for responsive to the reference pressure signal and the cabin pressure signal for producing a signal, or first output, indicative of the difference therebetween;

d. a derivative path comprising a proportional gain shaper, a derivative, an altitude dependent gain and a gain multiplier, wherein the gain shaper is electronically connected to the first output, wherein the derivative is electronically connected to the gain shaper, wherein the altitude dependent gain is electronically connected to the multiplier, and wherein the multiplier is electronically connected to the derivative;

e. a proportional path comprising an integral gain shaper, an independent altitude dependent gain, a gain multiplier, and a rate limit, wherein the integral gain shaper is electronically connected to the first output, wherein the independent altitude dependent gain is electronically connected to the multiplier, wherein the multiplier is electronically connected to the integral gain shaper, and wherein the rate limit is electronically connected to the gain multiplier;

f. means for combining and integrating the signals generated by the derivative and proportional paths and producing a signal, $\beta_R$, indicative thereof; and g. wherein the $\beta_R$ signal is electronically connected to an outflow valve which exhausts air from the aircraft cabin.

14. A method of generating a control signal, comprising the steps of:

a. generating a reference signal indicative of a desired value of a parameter;

b. generating an actual signal indicative of an actual value of the parameter;

c. comparing the reference signal with the actual signal, and generating an error signal indicative of any difference there between;

d. applying the error signal to two different paths, wherein a first path generates a derivative signal that is the derivative of the error signal and wherein a second path generates a proportional signal that is proportional to the error signal;

e. summing the derivative signal and the proportional signal and generating a summed signal indicative thereof; and f. integrating the summed signal and generating the control signal indicative thereof and in response thereto.

15. The method of claim 14, wherein the first path comprises a gain shaper, a derivative, a gain multiplier, and a gain.

16. The method of claim 14, wherein the second path comprises a gain shaper, a gain multiplier, a gain, and a rate limit.

* * * * *